United States Patent
Jarrassier et al.

(10) Patent No.: US 12,520,739 B2
(45) Date of Patent: Jan. 13, 2026

(54) METHOD FOR SETTING AND/OR CALIBRATING AN AGRICULTURAL MACHINE

(71) Applicant: KUHN SAS, Saverne (FR)

(72) Inventors: Benoît Jarrassier, Ottersthal (FR); Quentin Labourey, Ostwald (FR); Philippe Potier, Zittersheim (FR)

(73) Assignee: KUHN SAS, Saverne (FR)

( * ) Notice: Subject to any disclaimer, the term of this patent is extended or adjusted under 35 U.S.C. 154(b) by 177 days.

(21) Appl. No.: 18/555,901

(22) PCT Filed: Apr. 20, 2022

(86) PCT No.: PCT/EP2022/060436
§ 371 (c)(1),
(2) Date: Oct. 18, 2023

(87) PCT Pub. No.: WO2022/223630
PCT Pub. Date: Oct. 27, 2022

(65) Prior Publication Data
US 2024/0373775 A1    Nov. 14, 2024

(30) Foreign Application Priority Data

Apr. 22, 2021   (FR) ...................................... 21 04201

(51) Int. Cl.
*A01B 69/04*     (2006.01)
(52) U.S. Cl.
CPC .................... *A01B 69/008* (2013.01)
(58) Field of Classification Search
CPC ............................ A01B 69/008; A01B 69/04
(Continued)

(56) References Cited

U.S. PATENT DOCUMENTS 8,359,141 B1 * 1/2013 Lange ................. A01B 69/008
                                                     172/313
9,639,903 B2 * 5/2017 Rosa ....................... G01F 17/00
(Continued)

FOREIGN PATENT DOCUMENTS

BR    102022024438 A2 *  9/2023
BR    112018007534 B1 *  4/2024
(Continued)

OTHER PUBLICATIONS

International Search Report & Written Opinion Issued Aug. 3, 2022, in PCT/EP2022/060436, filed on Apr. 20, 2022, citing documents 1-4 & 15-18, with English Translation therein, 18 pages.

*Primary Examiner* — Atul Trivedi
(74) *Attorney, Agent, or Firm* — Oblon, McClelland, Maier & Neustadt, L.L.P.

(57) ABSTRACT

A method for setting and/or calibrating a mobile motorized agricultural machine, hereinafter referred to as an agricultural robot, which is equipped with a tool and is capable of autonomously working a plot, includes: at the beginning of the working phase on a new plot, and following a request by an operator or the validation of a request by an operator, in temporarily operating the robot in a semi-autonomous mode during which an operating parameter of the robot and/or of the tool is managed and adjusted by the operator, by the robot or by the tool, or by a combination of the three, in order for the robot to be set or calibrated for the subsequent autonomous working phase, upon validation by the operator.

11 Claims, 5 Drawing Sheets

(58) Field of Classification Search
USPC .......................................................... 701/50
See application file for complete search history.

(56) References Cited

U.S. PATENT DOCUMENTS

| | | | |
|---|---|---|---|
| 9,915,952 B2* | 3/2018 | Dollinger | A01B 69/008 |
| 10,151,839 B2* | 12/2018 | McPeek | G01S 7/4865 |
| 10,345,283 B1* | 7/2019 | Laird | C05C 11/00 |
| 11,635,765 B2* | 4/2023 | Vandike | B60K 35/22 |
| | | | 701/50 |
| 12,250,905 B2* | 3/2025 | Anderson | A01D 41/1272 |
| 2014/0025260 A1* | 1/2014 | McClure | B62D 1/286 |
| | | | 701/41 |
| 2015/0160655 A1* | 6/2015 | Korthals | A01B 69/008 |
| | | | 701/23 |
| 2016/0247082 A1* | 8/2016 | Stehling | G06N 7/01 |
| 2017/0177002 A1 | 6/2017 | Ogura et al. | |
| 2017/0311559 A1* | 11/2017 | Ebert | G05D 7/0629 |
| 2017/0355252 A1 | 12/2017 | Jackson | |
| 2018/0024549 A1* | 1/2018 | Hurd | G05D 1/0016 |
| | | | 701/2 |
| 2018/0206391 A1 | 7/2018 | Shinkai et al. | |
| 2019/0162855 A1* | 5/2019 | McPeek | G01C 21/1652 |
| 2019/0239502 A1* | 8/2019 | Palomares | G05D 1/0246 |
| 2020/0029490 A1* | 1/2020 | Bertucci | A01B 79/005 |
| 2020/0128738 A1* | 4/2020 | Suleman | A01D 41/1278 |
| 2020/0133262 A1* | 4/2020 | Suleman | G05D 1/0278 |
| 2020/0193589 A1* | 6/2020 | Peshlov | G06V 10/955 |
| 2020/0304699 A1* | 9/2020 | Basnet | H04N 25/63 |
| 2020/0341461 A1 | 10/2020 | Yokoyama | |
| 2021/0000006 A1* | 1/2021 | Ellaboudy | A01B 69/001 |
| 2022/0183208 A1* | 6/2022 | Sibley | A01B 69/001 |
| 2023/0270043 A1* | 8/2023 | Dugas | A01D 41/127 |
| | | | 56/10.2 E |
| 2023/0309450 A1* | 10/2023 | Wigdahl | A01D 46/085 |
| | | | 701/50 |
| 2024/0260562 A1* | 8/2024 | Kremesec | A01M 21/02 |
| 2025/0204339 A1* | 6/2025 | Kawashima | A01G 27/008 |
| 2025/0221350 A1* | 7/2025 | Camarena | A01G 22/05 |
| 2025/0261626 A1* | 8/2025 | Kremesec | A01B 63/163 |

FOREIGN PATENT DOCUMENTS

| | | | | | |
|---|---|---|---|---|---|
| CA | 3119812 | A1 | * | 6/2020 | ............ G06V 10/955 |
| CA | 3134781 | A1 | * | 10/2020 | ......... G06K 19/0723 |
| CN | 106595637 | A | * | 4/2017 | ............. G01C 21/00 |
| CN | 115309158 | A | * | 11/2022 | ............ G05D 1/0242 |
| DE | 102017207347 | A1 | * | 11/2018 | ............. A01F 15/08 |
| DE | 10 2019 000 794 | A1 | | 8/2020 | |
| EP | 2633460 | A1 | * | 9/2013 | |
| EP | 3 104 244 | A1 | | 12/2016 | |
| EP | 3 351 419 | A1 | | 7/2018 | |
| EP | 3 571 911 | A1 | | 11/2019 | |
| EP | 4207074 | A1 | * | 7/2023 | ............... G06T 7/80 |
| EP | 4075940 | B1 | * | 5/2025 | ........... G05D 1/0044 |
| JP | 2025002839 | A | * | 1/2025 | ............... G06T 7/70 |
| WO | WO-2012060947 | A1 | * | 5/2012 | ............. G06F 19/00 |
| WO | WO-2016123201 | A1 | * | 8/2016 | ............. H04N 23/11 |
| WO | WO-2020014527 | A1 | * | 1/2020 | ............. A01B 69/00 |
| WO | WO-2023243597 | A1 | * | 12/2023 | ............. A01B 69/00 |

* cited by examiner

METHOD FOR SETTING AND/OR CALIBRATING AN AGRICULTURAL MACHINE

BACKGROUND OF THE INVENTION

FIELD OF THE INVENTION

The present invention relates to the field of agricultural machinery and more specifically that of working the soil or plants of a plot of land by an autonomous agricultural vehicle, i.e. one that can work said plot without the assistance of an operator. Such a vehicle is commonly referred to as an agricultural robot and corresponds to a mobile and motorized agricultural machine or combination provided with at least one tool (integrated, mounted, semi-mounted or trailed) and including means (driving, communication, location determination, etc.) enabling it to work a plot autonomously.

In this context, the invention relates to a method for setting and/or calibrating such an agricultural robot, and an operation method for this robot.

Such an agricultural robot can be used alone to work a plot, or as part of a fleet of at least two robots assigned to said plot. This robot can operate completely independently (prescription map, GPS, etc.) or be remotely controlled by a central remote control system for controlling a fleet of robots, for example. The robots of a fleet may or may not communicate with each other and may, where applicable, be assigned to work a predetermined part of the plot.

DESCRIPTION OF THE RELATED ART

Typically, the performance of an agricultural task or operation on a plot by means of an autonomous agricultural machine essentially comprises three main steps, like a conventional, i.e. non-autonomous, agricultural work process carried out entirely under the control of an operator.

The first step, carried out by an operator, consists in bringing the agricultural robot and its tool(s) to the plot to be treated, carrying out any possible mounting or assembly operations required to configure the robot for the work to be carried out, and positioning it at the start of the route.

The second step consists in setting and/or calibrating the robot and its tool(s). Their operating parameters must in fact be set so that they match as closely as possible the actual working conditions of the day and the characteristics of the plot to be worked (humidity, temperature, wind, soil type and condition, density and quality of the plants to be treated, nature and intensity of the agricultural operations to be carried out, etc.). These parameters cannot be set in advance, and must therefore be set on site through trials and tests under actual conditions. Generally, and depending on the complexity of the settings and calibrations and the number of parameters concerned, several test cycles are required, each one consisting in making the robot work autonomously over a short distance with a set of settings.

At the end of this cycle, or of each of these consecutive cycles, the operator validates or rejects these settings depending on the quality of the work carried out (visual inspection). The quality of the work carried out can be inspected visually by the operator by observing the plot directly, or indirectly using at least one camera present on the robot and/or on at least one tool. The images captured by this camera can then be analyzed by the operator on a mobile control device. This leads to either a new test cycle with new settings if the quality of the work is insufficient, or to the continuation or restart of the work on the plot if the quality of the work is deemed satisfactory. During this third step, performed entirely in autonomous mode, the robot carries out the agricultural work with the latest validated settings and following the pre-established route, either independently or guided by a remote control system.

BRIEF SUMMARY OF THE INVENTION

In this context, the present invention aims to propose a solution making it possible to set and/or calibrate at least one operating parameter of at least one agricultural robot, in accordance with the actual conditions on site, that is more efficient than the current solutions and that avoids the need to use the autonomous work mode for the setting and/or calibration phase, and especially its interruption, repeated where applicable, as in the aforementioned state of the art.

The invention therefore relates to a method for setting and/or calibrating a mobile and motorized agricultural machine or combination, hereinafter referred to as an agricultural robot, provided with at least one tool and adapted to work a plot autonomously, a method characterized in that it consists, when starting a work phase on a new plot, when resuming an interrupted work phase on a given plot which has already been partially worked, in the event of a substantial modification of the plot characteristics during autonomous work and/or in the event of a significant deterioration in the quality of the work carried out by the agricultural robot when working autonomously, and following a request by an operator or validation of a request by an operator (5), in temporarily operating said robot in a semi-autonomous mode during which at least one operating parameter of said robot and/or of said at least one tool is managed and adjusted by this operator or by the robot, or by the tool, or by a combination of the three, in order to set or calibrate it for the next autonomous work phase, after validation by the operator.

The invention also relates to a method for putting in operation an agricultural robot for working a plot, integrating the aforementioned setting and/or calibration method.

BRIEF DESCRIPTION OF THE SEVERAL VIEWS OF THE DRAWINGS

The invention will be better understood from the following description, which refers to a preferred embodiment given as a non-limiting example and explained with reference to the attached schematic drawings, in which:

FIG. 3A and

DETAILED DESCRIPTION OF THE INVENTION

Figure 1:
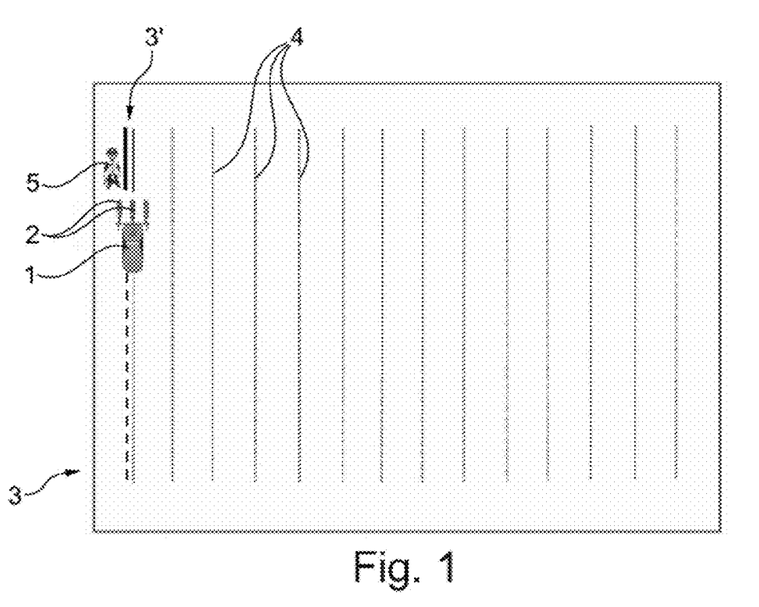
FIG. 1 is a diagrammatic top view of a plot on which an agricultural robot works an initial part of the plot in semi-automatic mode in conjunction with an operator and during a phase of setting and/or calibrating at least one operating parameter, according to the method of the invention.
Figure 2:
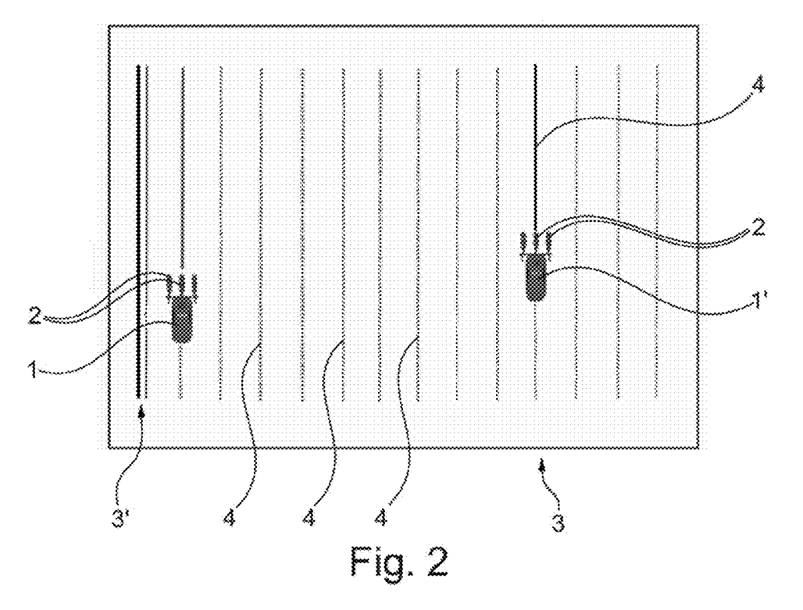
FIG. 2 shows the plot of FIG. 1, at a later time and worked by the agricultural robot operating in autonomous mode, with the parameters as set and calibrated at the end of the phase shown on FIG. 1, a second robot similar to that of FIG. 1 and sharing the same parameter settings and calibrations working autonomously another part of the same plot (right-hand side) of FIG. 2.
Figure 3A:
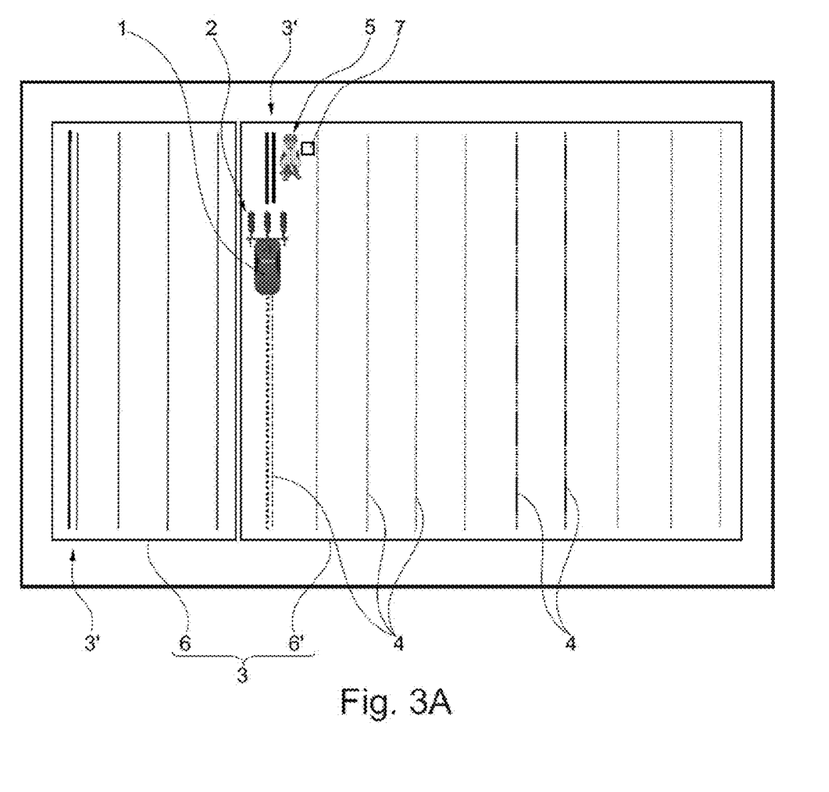
Figure 3B:
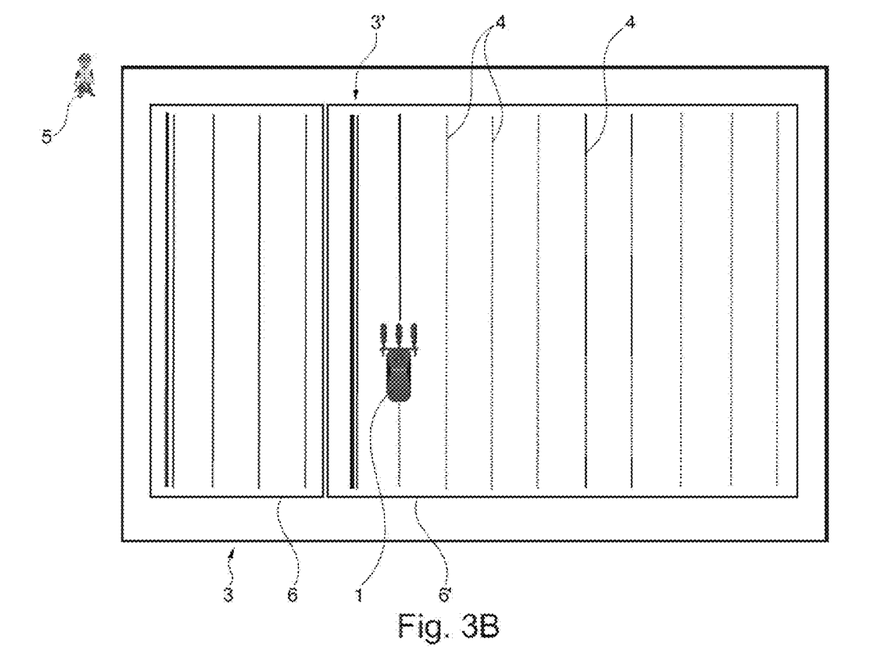
FIG. 3B show a plot divided into two areas with different characteristics or worked at different times, the first small area having been worked with first settings and calibrations of the operating parameters, and the second large area being worked autonomously by the agricultural robot (FIG. 3B), after a new phase of operation in semi-autonomous mode corresponding to a new setting and calibration phase (FIG. 3A), and, FIG. 4 is a flowchart illustrating one embodiment of the method according to the invention.
Figure 4:
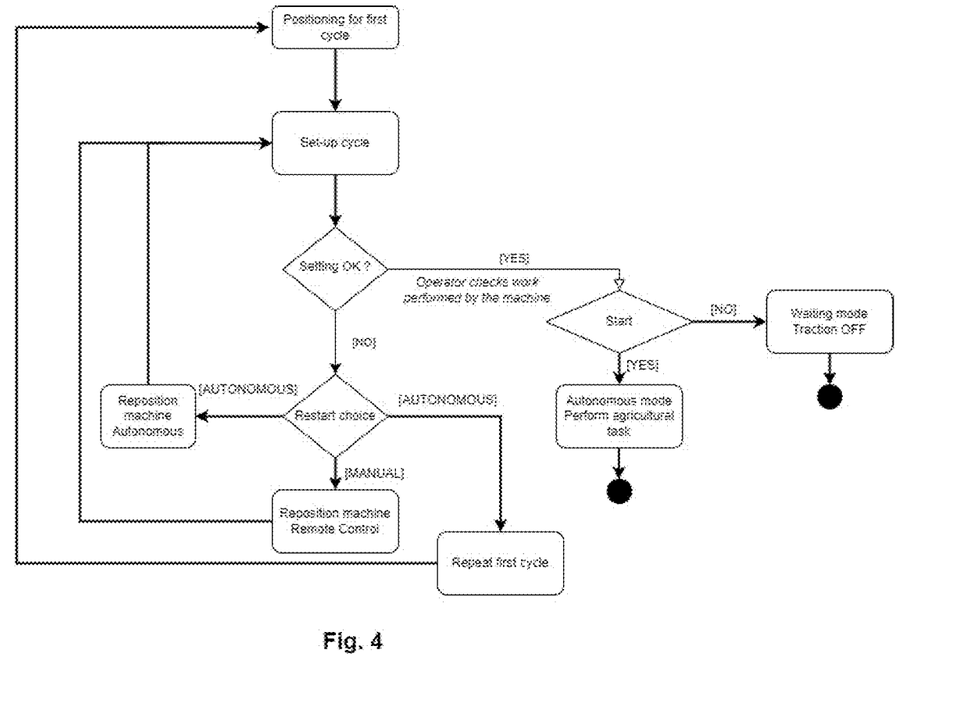

On FIGS. 1 to 3, the route still to be covered by the robot in autonomous work mode is shown as a single dotted line, and the route already covered in autonomous work mode is shown as a single continuous (solid) line. On these same figures, the route still to be covered by the robot in semi-autonomous work mode (setting and/or calibration mode) is shown as a double dotted line, and the route already covered in semi-autonomous work mode is shown as a double continuous (solid) line.

FIGS. 1 to 4 are diagrammatic or symbolic representations of a method for setting and/or calibrating a mobile and motorized agricultural machine or combination, hereinafter referred to as an agricultural robot (1), provided with at least one tool (2) and adapted to work a plot (3) autonomously.

According to the invention, this method is characterized in that it consists, when starting a work phase on a new plot, when resuming an interrupted work phase on a given plot which has already been partially worked, in the event of a substantial modification of the plot characteristics during autonomous work and/or in the event of a significant deterioration in the quality of the work carried out by the agricultural robot (1) when working autonomously, and following a request by an operator (5) or validation of a request by an operator (5), to temporarily operate said robot (1) in a semi-autonomous mode during which at least one operating parameter of said robot (1) and/or of said at least one tool (2) is managed and adjusted by this operator (5), by the robot (1), by the tool (2), or by a combination of the three, in order to set or calibrate it for the next autonomous work phase, after validation by the operator (5).

Thus, the invention provides a specific operating mode of the agricultural robot (1) during which either the operator (5), the robot (1) itself, the tool (2) itself, or a combination of the three, can set and/or calibrate on site, under actual conditions, directly, in real time and with visual inspection by the operator, at least one operating parameter (obviously adapted to be set or calibrated), without having to start the autonomous operating mode (and therefore without having to interrupt it).

When the operating parameter(s) to be set/calibrated is/are managed and adjusted by the operator, the other operating parameters (not modified during this phase) are managed by the robot as in the autonomous operating mode. In the other implementation variant of the method, i.e. when the robot manages and adjusts the operating parameter(s) concerned, the other operating parameters (not modified during this phase) are advantageously also managed by the robot. However, in both variants, the setting/calibration must be validated by the operator before switching to the autonomous work mode.

Preferably, the part of the plot (3') worked during the operating phase in semi-autonomous mode is not reworked during said next autonomous work phase. Thus, by already carrying out the work expected on the part of the plot (3') covered during this specific semi-autonomous operating phase, the area to be worked later in autonomous work mode is reduced by the same amount, resulting in higher productivity.

Advantageously, said at least one operating parameter of the agricultural robot (1) and/or of said at least one tool (2), which is managed and adjusted by the operator (5) or by the robot (1), or by the tool (2), or by a combination of the three, during the semi-autonomous operating phase, is selected from the group formed by the developed power, the speed of movement, the direction of movement, the configuration of the work route on the plot (3), the configuration of the robot (1) and the positioning and/or orientation and/or configuration and/or operating parameters of said at least one tool (2).

The other operating parameters are controlled by the robot as in the autonomous mode.

Depending on the type of robot and/or the type of the tool concerned, the method may consist in setting and/or calibrating at least two different operating parameters during the semi-autonomous operating mode, either by allowing them to be managed and adjusted simultaneously, or by allowing them to be managed and adjusted individually and separately during at least two consecutive phases. Thus, for example, the operator can simultaneously or successively set the configuration of the tool (2) and the speed of travel of the robot (1).

In the simplest cases and generally, the operating phase in semi-autonomous mode comprises only one operational cycle. During this phase, the robot (1) can cover a fraction of a row, an entire row or more than one row of the route (4) defined in advance for the plot (3) considered.

As a variant, however, and for more complex situations, the operating phase in semi-autonomous mode may comprise at least two consecutive cycles, in that during the second cycle and/or one at least of any possible subsequent cycles, the same operating parameter(s) is/are calibrated and/or set, each cycle being followed by a phase of validating the work carried out by the agricultural robot (1).

In addition or according to another variant, the operating phase in semi-autonomous mode could comprise at least two consecutive cycles, in that during the second cycle and/or one at least of any possible subsequent cycles, at least one second operating parameter, different from that concerned by the first cycle, is calibrated and/or set, each cycle being followed by a phase of validating the work carried out by the agricultural robot (1).

Advantageously, feedback concerning the results of the operating parameter(s) used during a work cycle in semi-autonomous mode could be used to determine the operating parameter(s) of the next cycle(s). This feedback can be obtained via at least one sensor present on the robot (1) and/or on the tool (2). The results of a cycle can thus be taken into account by the operator to narrow down the choice of the operating parameter(s) of the next cycle(s).

Depending on the type of work to be carried out, it may or may not be possible to go over the same area of the plot again.

According to a first embodiment variant, possible for example with a tillage operation, during each of the various consecutive cycles of the operating phase in semi-autonomous mode, the agricultural robot (1) could move over the same part of the plot (3') and along the same route (4) as during the first cycle, said robot (1) repositioning itself autonomously or not (at the start of the route).

According to a second embodiment variant, adapted for example for a seeding-type operation, during each of the various consecutive cycles of the operating phase in semi-autonomous mode, the agricultural robot (1) could move over different consecutive parts of the plot (3'), said robot (1) positioning itself autonomously or not (at the start of the route of the next part).

To take advantage of the experience acquired during the operating phase in semi-autonomous mode after the end of the work on the plot considered, for example for the next year, or to share the fruits of this experience during a subsequent agricultural operation, the method may consist in saving the setting and/or calibration profile of the agricultural robot (1) considered at the end of its operating phase in semi-autonomous mode, where applicable after a short validation phase in autonomous work mode, for its subsequent reuse under similar circumstances and/or for its transmission to at least one other similar agricultural robot (1') which is part of the same fleet as the agricultural robot (1) considered, and possibly intended to work the same plot (3).

To avoid unnecessary intervention by the operator, it may be possible, in particular before starting the setting/calibration phase, to determine the length of the route (4) to be covered by the agricultural robot (1) during the operating phase in semi-autonomous mode, in particular depending on the type of tool(s) (2), the characteristics of the plot (3) and/or the type of agricultural operation to be carried out.

Obviously, at least some of the settings or calibrations can be carried out manually, depending on the parameter considered. However, given the increasing degree of motorization and automation of the machines of the agricultural robot (1) type, several, or even most of the adjustable parameters could be managed and adjusted remotely by the operator. Under these conditions, a mobile interface means can be provided, that is adapted to communicate with the agricultural robot (1) and allowing the setting and/or calibration of at least one parameter during the operating phase in semi-autonomous mode, said interface means being able to indicate to the operator the operations to be carried out, the parameters to be set and/or calibrated and the occurrence of a new operating phase in semi-autonomous mode. Such a means (not shown, but carried by the operator on FIGS. 1 and 3A, for example) may advantageously consist of a tablet computer (7) or a smartphone, and also makes it possible, by means of preprogrammed sequences and a checklist, to ensure that a predefined protocol is respected, while providing improved ergonomics.

The interface means allows the operator to continuously monitor the setting and/or calibration method, and in particular to receive feedback from one cycle before determining the operating parameter(s) for the next cycle. In this case, the interface means and the sensor(s) present on the agricultural robot (1) and/or on the tool (2) communicate with each other directly or indirectly.

The feedback may include one or more types of information, such as for example numerical values, images or videos. These data can represent various information, such as a working depth, level of wear of a work tool, condition of the soil before and/or after the passage of the robot (1), representation of the soil, characteristic of the soil, quantity of residues, quality of the work carried out by the robot (1) and/or the tool (2), compliance with a threshold value or a work instruction, The interface means can be used to display information intended to help the operator during the setting and/or calibration method. This information can indicate to the operator the various actions to be carried out before, during and/or after the various operating phases and cycles. This information makes it possible to ensure not only that the operator respects a predefined setting and/or calibration protocol, but also simplifies the use of the overall system.

To cope with unforeseen events or even adapt to changing conditions, the invention may consist, for a given plot (3) and an agricultural robot (1) considered, and after a work phase in autonomous mode, in carrying out at least one second operating phase in semi-autonomous mode resulting in a modification of the setting and/or calibration of at least one operating parameter, depending on a prescription map associated with the plot (3), following an interruption of the autonomous work phase or after observing a deterioration in the quality of the work carried out by the robot (1). Possible unforeseen events include in particular interruption due to bad weather (change in conditions on site, but work already partially completed), interruption due to a breakdown or maintenance operation, or even significant heterogeneity of the plot worked (need to maintain homogeneous quality of work).

The resulting setting profiles are generally associated with a given [plot-robot-tool] configuration.

When the method is implemented in connection with an agricultural machine combination, comprising the robot with possibly at least one tool and at least one additional hitched agricultural machine, the method may also consist, during the operating phase in semi-autonomous mode of the agricultural robot (1) intended to set or calibrate at least one of its operating parameters and/or its tool (2), or during a subsequent operating phase, in setting and/or calibrating at least one operating parameter of a machine hitched to said robot (1) and/or at least one tool of such a machine.

The invention also relates to a method for putting in operation at least one agricultural robot (1) to work a plot (3), said robot (1) consisting of a mobile and motorized agricultural machine or combination, provided with at least one tool (2) and able to work a plot (3) autonomously, said method comprising at least one phase of positioning said agricultural robot (1) at the start of a work route on a given plot (3), under the control of an operator, at least one phase of setting and/or calibrating the robot (1), and where applicable its tool (2), and at least one autonomous work phase.

This method is characterized in that the execution of the or each phase of setting and/or calibrating said robot (1) and/or tool (2) is carried out in semi-autonomous work mode and consists in implementing the method described above.

According to one characteristic of the invention, a pre-established prescription map could be used to work the plot (3) and complete the route of the robot (1) on the plot, this map also comprising the location of at least one possible route segment corresponding to a new phase of setting and/or calibrating said robot (1), in semi-autonomous mode, when working the plot (3) and after an initial setting and/or calibration phase.

Such a second setting and/or calibration phase, illustrated on FIGS. 3A and 3B, may for example be recommended or necessary, in the event of an interruption, deliberate or not, a modification of the site conditions (rain), or even a change in the type of soil or plants.

Of course, the invention is not limited to the example embodiment described and shown in the attached drawings. Modifications remain possible, in particular as regards the composition of the various elements or the substitution by technical equivalents without departing from the scope of protection of the invention.

The invention claimed is:

1. A method for setting and/or calibrating a mobile and motorized agricultural machine or combination, hereinafter referred to as an agricultural robot, provided with at least one tool and able to work a plot autonomously, the method comprising:

temporarily operating said robot in a semi-autonomous mode, when starting a work phase on a new plot, when resuming an interrupted work phase on a given plot which has already been partially worked, in an event of a substantial modification of the plot characteristics during autonomous work and/or in the event of a significant deterioration in the quality of the work carried out by the agricultural robot when working autonomously, and following a request by an operator or validation of a request by an operator, in which at least one operating parameter of at least one of said robot and said at least one tool is managed and adjusted by at least one of the operator, the robot, and the tool;

validating, by the operator, the at least one operating parameter; and setting and/or calibrating the validated at least one operating parameter for a subsequent autonomous work phase.

2. The method according to claim 1, wherein a part of the plot worked during the temporary operation of the robot in the semi-autonomous mode is not reworked during said subsequent autonomous work phase.

3. The method according to claim 1, wherein said at least one operating parameter includes at least one of developed power, speed of movement, direction of movement, configuration of a work route on the plot, and configuration of the robot, and at least one of positioning, orientation, configuration, and operating parameters of said at least one tool.

4. The method according to claim 1, wherein the method comprises setting and/or calibrating at least two different operating parameters during the semi-autonomous operating mode, either by allowing the at least two different operating parameters to be managed and adjusted simultaneously, or by allowing the at least two different operating parameters to be managed and adjusted individually and separately during at least two consecutive phases.

5. The method according to claim 1, wherein the temporary operation of the robot in the semi-autonomous mode comprises at least two consecutive cycles, in that during at least one of the second cycle and a possible subsequent cycle, same at least one operating parameter is calibrated and/or set, and in that each cycle is followed by a phase of validating the work carried out by the agricultural robot.

6. The method according to claim 1, wherein the temporary operation of the robot in the semi-autonomous mode comprises at least two consecutive cycles, in that during at least one of the second cycle and a possible subsequent cycle, at least one second operating parameter, different from the at least one operating parameter concerned by the first cycle, is calibrated and/or set, and in that each cycle is followed by a phase of validating the work carried out by the agricultural robot.

7. The method according to claim 1, wherein the method comprises saving the setting and/or calibration profile of the agricultural robot considered at an end of its operating phase in semi-autonomous mode, where for its subsequent reuse under similar circumstances and/or for its transmission to at least one other similar agricultural robot which is part of a same fleet as the agricultural robot.

8. The method according to claim 1, wherein the method comprises determining a length of a route to be covered by the agricultural robot during temporary operation of the robot in the semi-autonomous mode.

9. The method according to claim 1, wherein the method comprises providing a mobile interface means, that is able to communicate with the agricultural robot and allowing the setting and/or calibration of the at least one operating parameter during the temporary operation of the robot in the semi-autonomous mode, said interface means being able to indicate, to the operator, at least one of operations to be carried out, parameters to be set and/or calibrated, and an occurrence of a new operating phase in semi-autonomous mode.

10. The method according to claim 1, wherein the method comprises carrying out, for a given plot and an agricultural robot considered, and after a work phase in autonomous mode, at least one second operating phase in semi-autonomous mode resulting in a modification of the setting and/or calibration of at least one operating parameter, depending on a prescription map associated with the plot, following an interruption of the autonomous work phase or after observing a deterioration in the quality of the work carried out by the robot.

11. A method for putting in operation at least one agricultural robot to work a plot, said robot including a mobile and motorized agricultural machine or combination, provided with at least one tool and able to work a plot autonomously, said method comprising:

positioning said agricultural robot at a start of a work route on a given plot, under the control of an operator, setting and/or calibrating at least one of the robot and the at least one tool, and and at least one autonomous work phase, wherein the setting and/or calibrating said at least one of the robot and the tool is carried out in semi-autonomous work mode and comprises implementing the method according to claim 1.

* * * * *